United States Patent [19]

Battista et al.

[11] Patent Number: 4,761,121

[45] Date of Patent: Aug. 2, 1988

[54] ROTARY PUMP WITH AN IMPROVED AIR EXTRACTION SYSTEM FOR SACKING GROUND MEAT

[76] Inventors: Righele G. Battista, Via Tiziano, 4, 36010 Zane' (Vicenza); Scorzato Giuseppe, Via Prole, 48, 36035 Marano Vicentino (Vicenza), both of Italy

[21] Appl. No.: 933,565

[22] Filed: Nov. 21, 1986

[30] Foreign Application Priority Data

Dec. 17, 1985 [IT] Italy .................................. 2417785[U]

[51] Int. Cl.$^4$ ........................ F04C 2/344; F04C 15/00
[52] U.S. Cl. .................................... 418/15; 418/180; 418/231; 415/140
[58] Field of Search ............... 415/140, 141; 416/112; 418/229, 230, 231, 232, 15, 180

[56] References Cited

U.S. PATENT DOCUMENTS

| | | | |
|---|---|---|---|
| 2,454,048 | 11/1948 | Flanagan | 418/180 X |
| 3,315,610 | 4/1967 | Salminen | 418/231 |
| 3,526,470 | 9/1970 | Swanson | 418/15 |
| 4,215,977 | 8/1980 | Weatherston | 418/180 X |

FOREIGN PATENT DOCUMENTS

| | | | |
|---|---|---|---|
| 2249250 | 5/1975 | France | 418/230 |
| 21460B | 4/1979 | Italy . | |
| 702036 | 1/1954 | United Kingdom | 418/231 |

*Primary Examiner*—Robert E. Garrett
*Assistant Examiner*—Joseph M. Pitko
*Attorney, Agent, or Firm*—Steele, Gould & Fried

[57] ABSTRACT

The pump includes a stator and a rotor which describe an upper annular chamber having a filling mouth and a delivery mouth and a lower annular chamber in which is housed an annular cam to drive the pump blades housed in a vertically sliding manner in respective radial passages of the rotor. Into the lower chamber essentially in a position diametrically opposed to the filling mouth there opens an exhaust mouth which communicates with the upper chamber through an ample passage and with the zone of the lower chamber underlying the filling mouth through a narrow passage.

4 Claims, 3 Drawing Sheets

ROTARY PUMP WITH AN IMPROVED AIR EXTRACTION SYSTEM FOR SACKING GROUND MEAT

The present invention relates to a rotary pump with an improved air-extraction system for sacking ground meat.

A known rotary sacking pump described in Italian patent application No. 21460 B/79 filed Apr. 30, 1979 comprises a stator with a cylindrical internal cavity having a vertical axis and a rotor housed in a rotating manner in said cylindrical cavity of the stator. The rotor is made up of a higher central part and a lower peripheral part in such a manner as to describe over said peripheral part an upper annular chamber into which the ground meat is fed from a filling mouth and moved to a delivery mouth by pump blades housed in a vertically sliding manner in radial passages in the periphery of the rotor and driven alternately to protrude from and return within the space occupied by said peripheral part in accordance with a predetermined sequence. Said sequence is determined by at least one fixed annular cam which is located in a lower annular recess placed under said peripheral part of the rotor and on which said pump blades rest.

To deaerate said ground meat as is necessary for homegenous filling of the sacks the aforesaid pump includes an exhaust mouth which opens into the upper annular chamber downstream from the delivery mouth and from a separating baffle appropriately provided and, utilizing suitable play, causes a certain exhaust of the air contained in the lower chamber of the pump.

This known solution has some shortcomings which can be summarized as follows.

(A) Exhaust of air from the lower pump chamber provided only by the play between the moving parts is insufficient. The remaining air is compressed by the pump blades when they operate in the retracted position, forming a single large bubble, which is forced into the upper pump chamber and then into the ground meat through the small channel usually provided for recovery of the filtered meat in the lower chamber. The effect thus obtained is contrary to deaeration.

(B) When the pump blades begin to wear due to continuous sliding against the cam (or cams if, as is preferable, there is provided an upper cam to complement the lower one), the ground meat tends to pass under the separating baffle and thus enter into the zone downstream therefrom where it is sucked in to be conveyed with obviously harmful effects to the sucking apparatus.

(C) To create near the filling mouth a vacuum capable of ensuring input of the ground meat into the pumping chamber with the pressure and hence the desired degree of homogeneity, given the proximity of the suction mouth to the filling mouth, it is possible to use only the normal play which, if made very small to prevent passage of liquid products to be sacked, they become quite inadequate to ensure the desired vacuum in the pumping chamber. Large unbalances are caused in this manner both in the quality of the product and in the precision of the pump.

OBJECTS AND SUMMARY OF THE INVENTION

The object of the present invention is to accomplish a rotary sacking pump including a deaeration system capable of overcoming the above-mentioned shortcomings.

In accordance with the invention said object is achieved with a sacking pump comprising a stator with a cylindrical internal cavity having a vertical axis and a rotor housed in a turning manner in said cylindrical cavity of the stator, said rotor being formed of a higher central part and a lower peripheral part in such a manner as to describe above said peripheral part an upper annular chamber in which the ground meat from a filling mouth is made to advance toward a delivery mouth by pump blades housed in a vertically sliding manner in respective radial passages in the peripheral part of the rotor, said blades being driven alternately to protrude from and return within the space occupied by said peripheral part in accordance with a predetermined sequence from at least one fixed annular chamber located in a lower annular chamber under said peripheral part of the rotor and on which rest said pump blades, and there being provided an exhaust mouth for deaeration of the ground meat characterized in that said exhaust mouth opens into said lower chamber of the pump in a position essentially diametrically opposed to said filling mouth and communicates with the overlying upper annular chamber through an ample passage and with the zone of said lower chamber underlying said filling mouth through a narrow passage.

In this manner, not only the upper annular chamber but also all of the lower chamber of the pump is placed in a vacuum, preventing the formation of air bubbles pumped into the product to be sacked. Through the aforesaid narrow passage, preferably made in the form of a circular sector between the central part of the rotor and the annular cam, the vacuum is made to reach the zone underlying the filling mouth where, utilizing the play between the various moving parts, there is assured a considerable downward thrust of the product being fed and hence excellent homogenization of the product in the pump chamber. At the same time small quantities of product filtered into the lower chamber of the pump cannot reach the exhaust mouth and hence the exhaust apparatus because the pump blades, sliding on the lower cam push it back toward the usual channel where it returns upward to the upper chamber.

BRIEF DESCRIPTION OF THE DRAWINGS

The features of the present invention will be made clearer by the following detailed description of a practical embodiment thereof illustrated as an example in the annexed drawings wherein.

DETAILED DESCRIPTION

Figure 1:
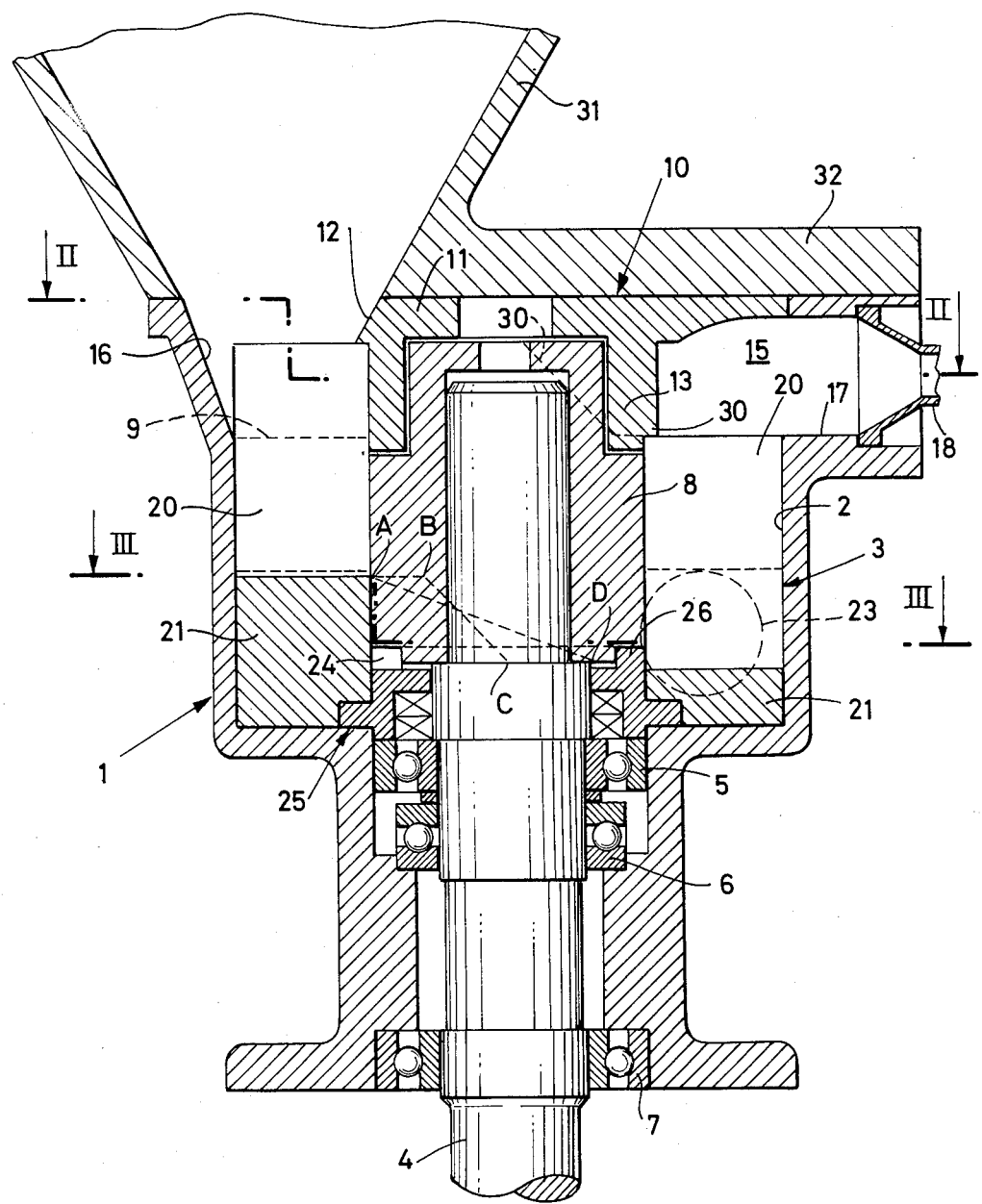
FIG. 1 shows an axial section along line I—I of FIG. 2 of a sacking pump in accordance with the invention.

Referring to the drawings there is shown a rotary sacking pump comprising a stator 1 provided with a cylindrical cavity 2 having a vertical axis and a rotor 3 housed in a turning manner in said cylindrical cavity of the stator. Rotation of the rotor 3 in the direction indicated by the arrow F of FIG. 2 is provided by a drive shaft 4 supported by the stator 1 by means of three bearings 5, 6 and 7.

The rotor 3 consists of a cylindrical central part 8 and a lower annular peripheral part 9. On the central part 8 there is fitted a cover 10 which is made in a single piece including a circular plate 11 with a hole 12, an annular collar 13 disposed with play around the central part 8 of the rotor 3, a radial baffle 14 with the lower end in sliding contact with the upper end of the peripheral part 9 of the rotor 3, and a fixed annular cam 30 the purpose of which will be clarified below. On the cover 10 at the hole 12 there is placed a loading hopper 31 with a side flange 32.

Figure 2:
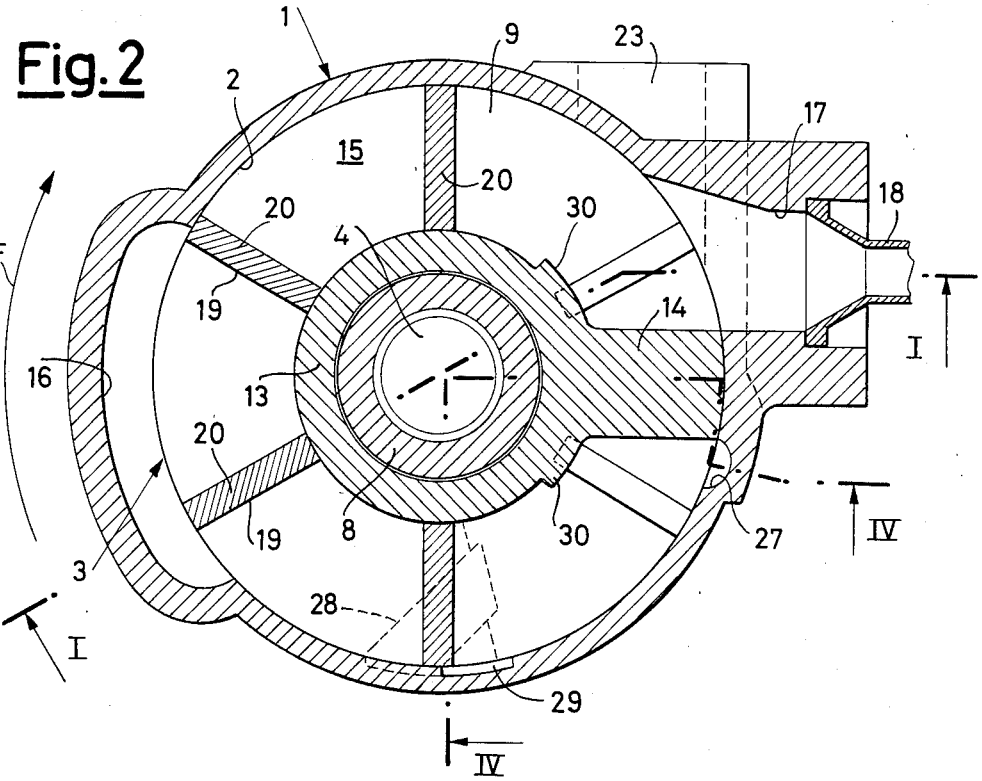
FIG. 2 shows a cross section along line II—II of FIG. 1 of said sacking pump.

As can be seen in FIGS. 1 and 2, between the stator 1, the rotor 3 and the cover 10 there is created an upper annular chamber 15 which has a filling mouth 16 coinciding with the hole 12 in the cover 10 and a delivery mouth 17 with a funnel opening 18 on which is to be fitted the gut to be filled with ground meat delivered by the pump. The radial baffle 14 is placed immediately downstream from the delivery mouth 17 to act as a partition for the annular chamber 15.

In the peripheral part 9 of the rotor 3 there are made six equally spaced radial passages 19 (FIG. 2) in which are housed in a sliding manner the same number of pump blades 20 which are driven to alternately protrude from and return into the space occupied by the aforesaid peripheral part in conformity with a predetermined sequence determined by the above described upper annular cam 30 against which slide the upper ends of the blades 20 and by a complementary fixed lower annular cam 21 which is housed in a lower annular chamber 22 described between the peripheral part 9 of the rotor 3 and the bottom of the inner cavity 2 of the stator 1 and supports in sliding contact the lower ends of the blades 20.

Figure 3:
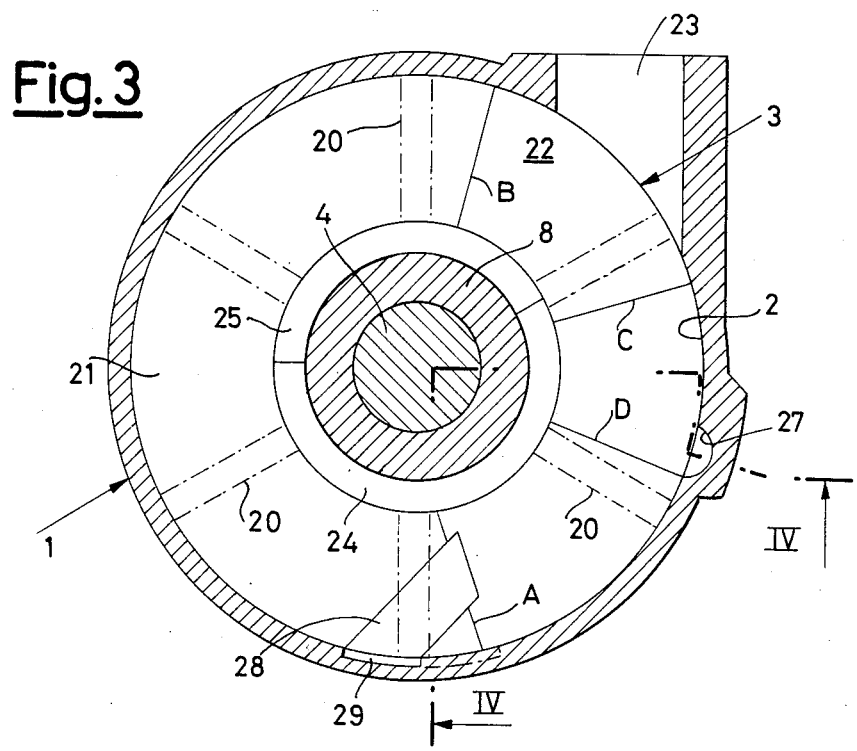
FIG. 3 shows a cross section along line III—III of FIG. 1 of said sacking pump.
Figure 4:
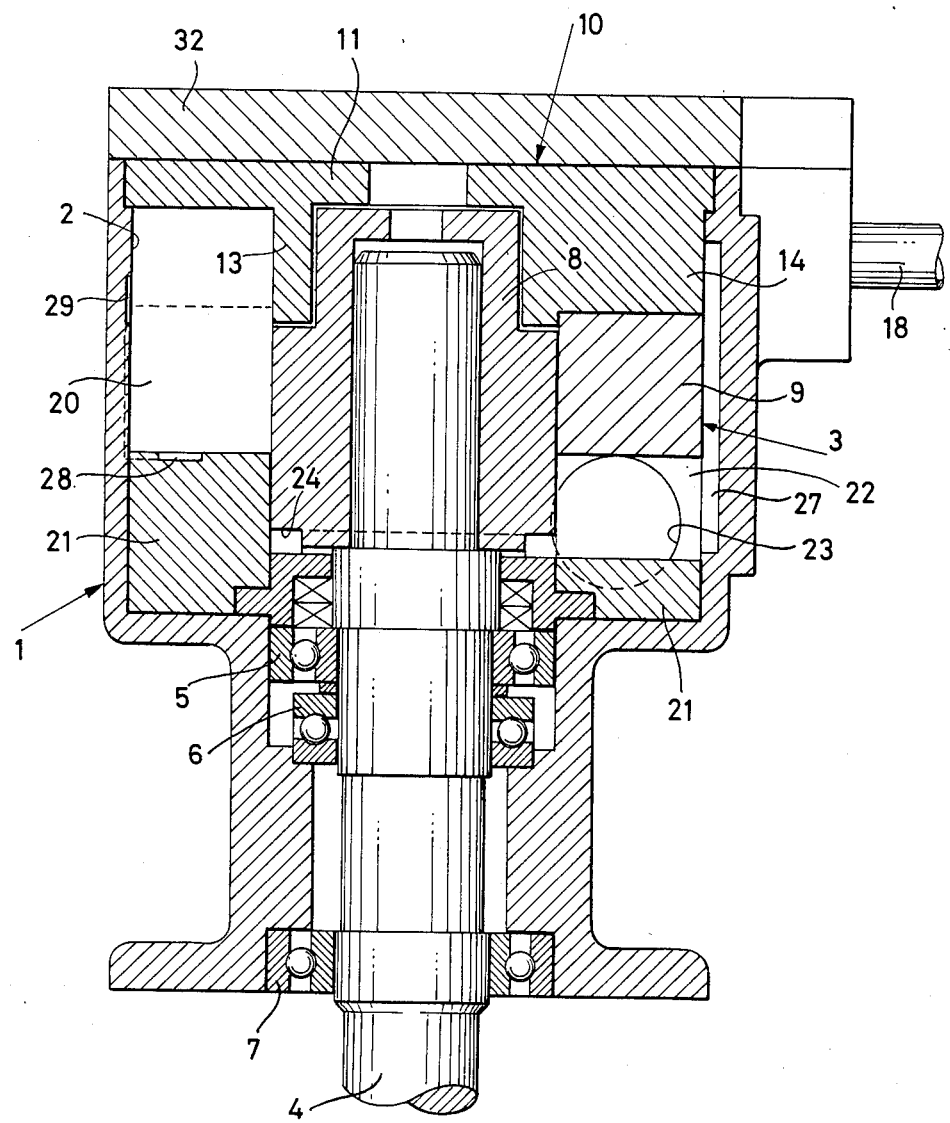
FIG. 4 shows an axial section along line IV—IV of FIGS. 2 and 3 of said sacking pump.

As shown in FIGS. 1, 3 and 4 the lower annular cam 21 includes a raised flat section A-B which extends from a point A upstream from the filling mouth 16 to a point B upstream from the delivery mouth 17, a descending section B-C which extends from the aforesaid point B to a point C essentially coinciding with the delivery mouth 17, a lowered flat section C-D which extends from the aforesaid point C to a point D downstream from the separating baffle 14, and finally an ascending section D-A. As a consequence the pump blades 20 protrude to the greatest extent from the peripheral part 9 of the rotor 3 in the section A-B, which comprises the filling mouth 16 and reaches to the proximity of the delivery mouth 17 to then descend progressively in the B-C section until it disappears entirely and passes under the separating baffle 14 in the C-B section, i.e. in the zone coinciding with the delivery mouth 17, when they are required to not obstruct the pumping action of the following blade 20.

As shown in FIGS. 3 and 4, in the lower chamber 22 in a position diametrically opposed to the position underlying the filling mouth 16 there opens an exhaust mouth 23 appropriately connected to an exhaust apparatus (not represented). Said exhaust mouth also communicates with the abovesaid zone underlying the filling mouth 16 through a narrow passage 24 (FIGS. 1, 3 and 4) which is formed of a lower annular groove in the central part 8 of the rotor 3 which borders on the annular cam 21 and on a fixed lower ring 25 and is partially filled by a semicircular upper protrusion 26 (FIG. 3) of said fixed ring 25. The exhaust mouth 23 communicates also with the underlying zone (downstream from the separating baffle 14) of the annular chamber 15 through an ample vertical channel 27 (FIGS. 2-4) which develops inside the side wall of the stator.

Finally, in the bottom of the raised part A-B of the lower annular cam 21 upstream from the filling mouth 16 there is a groove 28 (FIG. 3) which continues in an oblique rising channel made in the side wall of the stator 1 until it emerges in the upper annular chamber 15 (FIG. 4).

Due to the effect of the structure described the pump illustrated in the drawings operates as follows. As a result of the rising and falling motion imparted to the blades 20 by the complementary cams 21 and 30 the part of the upper annular chamber 15 which is included between points A and B is divided in a plurality of compartments into each of which is fed from the filling mouth 15 a metered quantity of ground meat. Thanks to the vacuum created by the exhaust mouth 23 in the lower chamber 22 and transmitted beneath the filling mouth 16 and thanks to the partially free annular groove 24 and the play existing between the moving parts, the meat is fed under appropriate pressure to ensure homegeneity of the sacked product.

Due to the effect of the rotary motion of the rotor 3 said metered quantities of meat are conveyed by the underlying pump blades 20 to a delivery mouth 17, moving in the last part of their path along the annular chamber 15 in a nearly straight line without obstacles, which avoids grinding and chopping of the meat and its reduction to slime. The exhaust mouth 23 ensures through the vertical passage 27 deaeration of the pumped product and elimination of the air present in the lower chamber 22.

Any small quantities of meat filtered into said lower chamber due to the effect of play and wear are pushed back from the exhaust mouth 23 by the lower portions of the pump blades 20 which protrude from the bottom of the peripheral part 9 of the rotor. The groove 28 and the oblique channel 29 (FIGS. 3 and 4) allow said quantities of meat to return into the upper chamber 15 to be pumped to the delivery mouth 17 together with the newly input meat.

What is claimed is:

1. Rotary pump for sacking ground meat comprising a stator with a cylindrical cavity with a vertical axis and a rotor housed in a turning manner in said cylindrical cavity of the stator said rotor being formed of a higher central part and a lower peripheral part so as to describe over said peripheral part an upper annular chamber into which the ground meat is fed from a filling mouth and made to advance to a delivery mouth by pump blades housed in a vertically sliding manner in respective radial passages in the peripheral part of the rotor, said blades being driven alternately to protrude from and return into the space occupied by said peripheral part in conformity with a predetermined sequence determined by at least one fixed annular cam located in a lower annular chamber located beneath said peripheral part of the rotor and on which there rest said pump blades and being provided with an exhaust mouth for deaeration of the ground meat, characterized in that said exhaust mouth opens into said lower chamber of the pump in a position essentially diametrically opposed to said filling mouth and communicates with the overlying annular chamber through an ample passage and with a zone of said lower chamber underlying said filling mouth through a narrow passage.

2. Sacking pump in accordance with claim 1 characterized in that said ample passage consists of an ample vertical channel which develops inside the side wall of the stator.

3. Sacking pump in accordance with claim 1 characterized in that said narrow passage is formed of a lower groove in the central part of the rotor which borders on said fixed annular cam.

4. Sacking pump in accordance with claim 3 characterized in that said groove is circular in form and is partially filled by a semicircular sector fixed to the bottom of the stator.

* * * * *